April 9, 1929.   L. W. HOTTEL   1,708,791
PRESS FOR FORMING PLASTIC ARTICLES
Filed Nov. 2, 1927   3 Sheets-Sheet 3
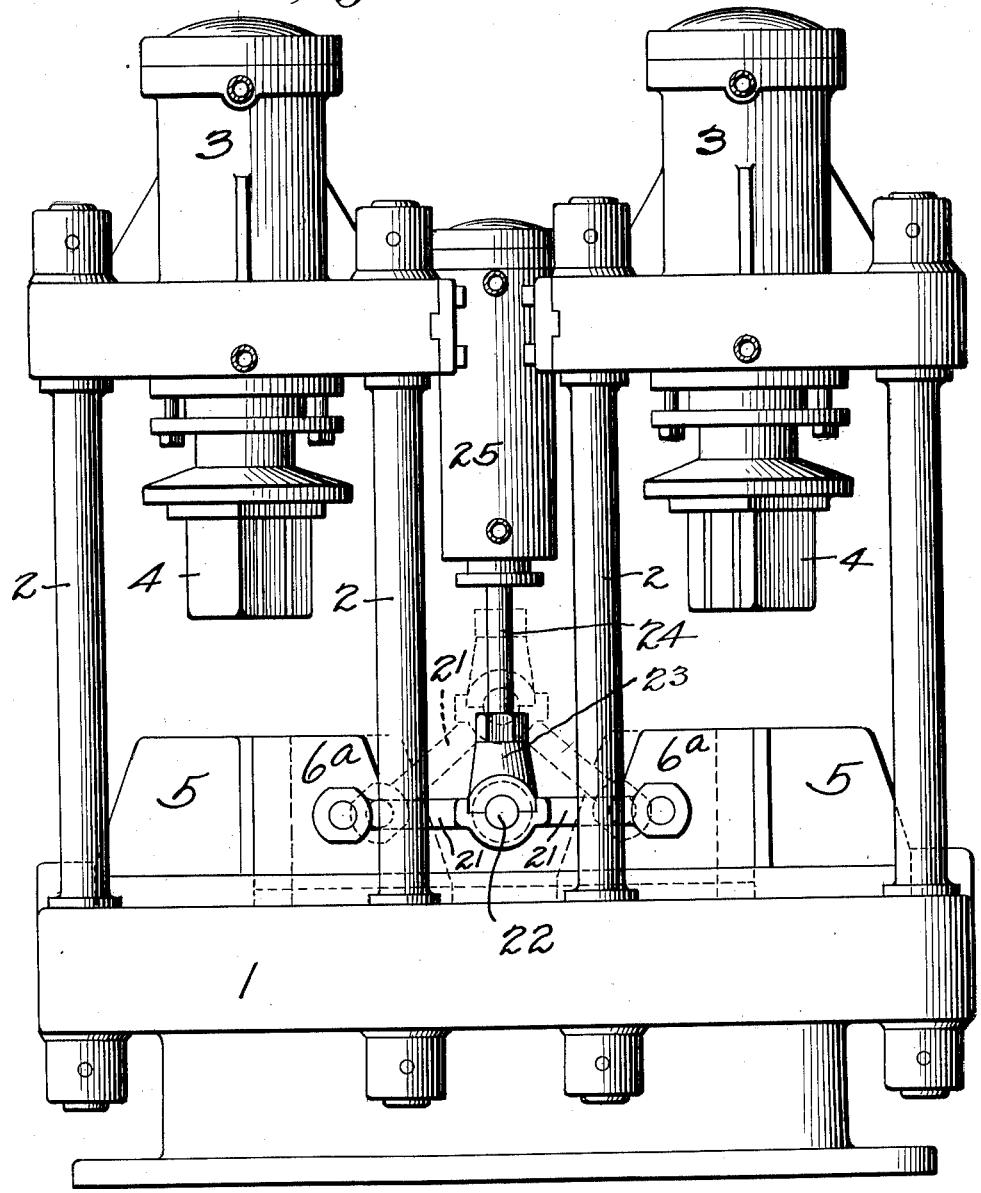

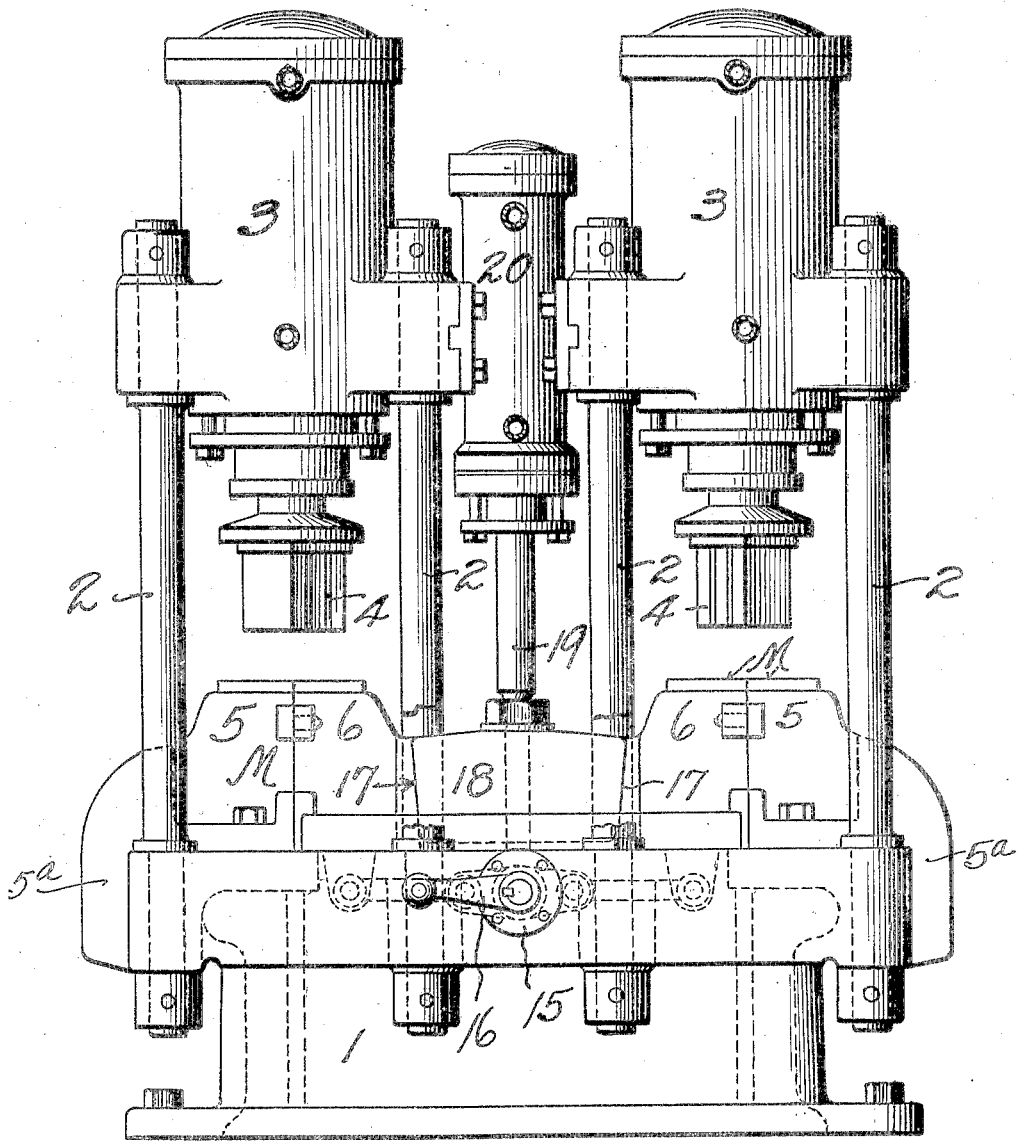

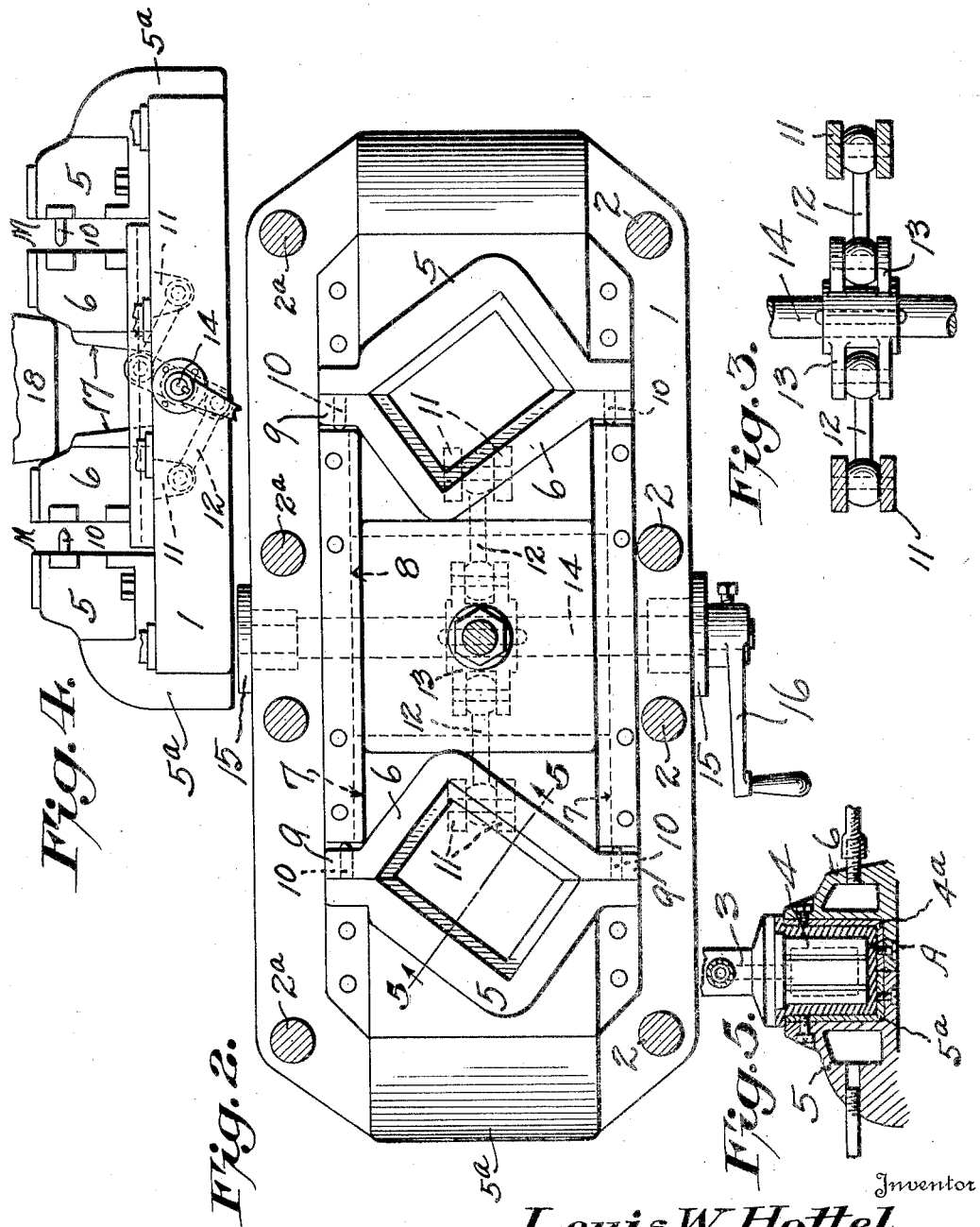

Patented Apr. 9, 1929.

1,708,791

UNITED STATES PATENT OFFICE.

LOUIS W. HOTTEL, OF DETROIT, MICHIGAN.

PRESS FOR FORMING PLASTIC ARTICLES.

Application filed November 2, 1927. Serial No. 230,529.

This invention relates to a molding press of the type for forming a plastic composition into hollow articles, and more particularly to a novel construction for making electrical storage-battery boxes and the like.

Accordingly, the present invention has as its primary object the provision of a novel construction and arrangement of parts wherein a battery box or the like can be made economically and rapidly from a suitable acid-proof plastic composition placed in a single mass in the mold, and possessing adequate plasticity to permit the box or article to be formed by the closing of the mold, and a sufficient set or hardening to retain the formed article in shape before removing the same from the mold.

Another object of the invention is to provide a press wherein one or more core members are fluid actuated and operate in conjunction with a mold including rigid or fixed sections and a laterally separable part which may be wedged or locked in engagement with the fixed or stationary part by the operation of a fluid pressure cylinder.

A further object of the invention is to provide a construction wherein the laterally separable mold part may, for the greater portion of its movement toward and from the fixed mold part, be manually manipulated.

With the above and other objects in view which will more readily appear as the nature of the invention is better understood, the same consists in the novel construction, combination and arrangement of parts hereinafter more fully described, illustrated and claimed.

A preferred and practical embodiment of the invention is shown in the accompanying drawings, in which :—

Figure 1 is a front elevation of a press embodying the present improvements.

Figure 2 is a horizontal sectional view showing the mold parts in plan.

Figure 3 is an enlarged detail view of the shaft and links for effecting the manual operation of the laterally separable mold parts.

Figure 4 is a detail view illustrating the mold parts in inoperative positions.

Figure 5 is a detail vertical sectional view taken on the line 5—5 of Fig. 2, the same showing the core in the mold casing and also showing the means for heating the mold casing and cooling the core.

Figure 6 is an elevation similar to Figure 1 showing the modified form of apparatus.

Similar reference characters designate corresponding parts throughout the several figures of the drawings.

In carrying the present invention into effect it is proposed to provide a press including a bed 1 which carries therewith a plurality of vertically disposed standards 2 for supporting the hydraulic rams 3 or their equivalent. The said rams 3 carry therewith the core members 4 which are adapted to cooperate with the two-part molds designated generally as M.

As will be observed from the drawings one-half of the mold 5 is made integral and therefore stationary with respect to the bed 1 as indicated at 5ª. The other half or movable part 6 of the mold is arranged at the inside of the press and is laterally shiftable or slidable toward and from the stationary mold section 5. The movable section 6 of the mold is provided with the flanges 7 adapted to slide in a guide-way 8 in the bed of the machine, and the laterally projected side wings 9 of the movable mold section are provided with openings for receiving the centering pins or lugs 10 of the fixed or stationary mold section 5.

One of the distinctive features of the invention resides in the provision of the stationary mold section 5 and the laterally movable mold sections 6 which cooperate to provide for quickly and effectively releasing the finished article, and easily and effectively assembling mold parts. According to the preferred form of the invention, the laterally movable sections 6 may, for facility of operation, be manually as well as automatically adjusted with reference to the fixed section, or as shown in Fig. 6, the entire movement of the shiftable section can be effected by mechanical means. In either case, however, the movable section is subjected to a preliminary adjusting or setting movement, and a final wedging movement which will prevent the operation of the shiftable section of the core under the tremendous pressure resulting from the core 4 pressing the plastic material to all corners of the mold.

Referring now more particularly to Figs. 1 and 2 it will be observed that the movable or shiftable mold section 6 is provided with a depending lug 11 adapted to be engaged by a link 12 which in turn is pivotally connected with a hub 13 carried upon a shaft 14 mounted in the bed 1 of the machine by the journal members 15, and is provided at one end with a handle or crank 16 to permit of the rocking of the shaft to manipulate the hub 13. The operation of the handle in one direction will shift the mold section 6 away from the mold sections 5, and its operation in the other direction will bring the mold parts into position to form the article.

As will be observed from Figs. 1 and 4 in particular, the rear sides of the section 6 are provided with the inclined or wedge faces 17 which cooperate with corresponding faces on a wedge 18 carried by a rod 19 operating in the piston 20. Thus, the shiftable mold sections 6 may be forced into wedging engagement with the rigid stationary sections 5 by means of the power operated wedge 18 which acts as a lock and prevents any possibility of accidental operation of the shiftable mold sections under the pressure of the cores 4.

The provision of the pressure operated wedge 18 in connection with the manually operated means for shifting the sections 6 has the advantage that the center piston or ram 20 may be manipulated to slightly raise the wedge 18 to automatically release the terrific pressure which has been exerted upon the core and side walls of the box. This movement may only be for a fraction of an inch. Then the rams 3 which carry the cores 4 can be reversed and they will come out of the mold very easily. Of course, the cores 4 could be pulled out while the mold comprising the sections 5 and 6 is in its firm position, and it is not contemplated to move the central wedge 18 sufficiently to cause the article to shift in its original cavity, but simply enough to relieve that terrific strain imposed during the pressing operation, thereby to better preserve the finished article A than to pull the core out of the same with the full strain of the mold on it.

The above described relief of the pressure on the side plates of the mold is of much practical importance since it not only releases the pressure on the mold sections, but also automatically releases the pressure on the article or box and on the core.

The same theory of operation applies to the construction shown in Fig. 6 wherein the only difference is that the construction resides in the operation of the inside laterally movable mold sections 6ª by means of power operated links. That is to say, the links 21 are connected at one end with the sections 6ª which in turn are journaled as at 22 upon the shaft carried by a reciprocating head 23 suspended from the rod 24 and operated by the ram 25. As the ram 25 is operated to move the links 21 from the dotted line position of Fig. 6 to the full line position, the sections 6ª are advanced toward the stationary or rigid mold sections 5. By continuing the movement of the rod 24 until the links 21 assume the horizontal position shown in Fig. 6, the sections 6ª will be wedged into engagement with the sections 5 and thus held locked against the ex-pressing pressure incident to the cores 4 forcing the plastic material into the shape provided for by the mold.

Figure 5 of the drawings is a detail view intended to illustrate the manner of jacketing the mold casing and core to provide differential temperatures according to the materials employed. For example, I have illustrated a cold type of press as distinguished from a vulcanizing press but even in this cold type of press, the material or materials are pressed hot and cooled under pressure, and to that end utilize warm water circulating around the sides of the mold casing or die box to give the article a high polish or finish, while cold water is used in the core for the purpose of cooling the materials quickly and also to prevent the material from sticking to the core.

Also Figure 5 of the drawings illustrates the use of liner plates in the mold sections. These liner plates are designated respectively as 4ª and 5ª and are held in the sections by suitable screws or equivalent fastenings. These plates or linings are not removable from the mold sections but are utilized because it is easier to machine the lining plates than it is the large castings which form the sections, thereby providing a smooth interior for the mold casing in an economical manner.

It is also pointed out that the rams 3 and 20 of Fig. 1 as well as 3 and 25 of Fig. 6 are provided with suitable piping connections for supplying fluid pressure to the pistons thereof. These connections have not been shown in detail, for the sake of clearness but the relative location of the connections are shown.

In the embodiment of the invention shown in the drawings a multiple type press has been illustrated, this type being particularly adapted for maximum production and ease of operation.

The operation of the device is substantially as follows:—The shiftable mold sections 6 are moved into contacting relation with the edges of the stationary mold sections 5, and then the center ram 20 may be dropped so that the wedge 18 will firmly lock the shiftable sections in place. The material may then be put in the mold cavity and the rams 3 carrying the cores 4 may be then lowered to form the battery box or other article. To extract the box or other article, the pressure on the two large rams 3 is reversed, thus pulling the cores out. When the cores are removed pressure may be put on the lower piston of the center ram 20 pulling the wedge 18 out of place between the sections 6. One-half of each mold is then moved away from the fixed or stationary half by turning the crank 16 which leaves the box resting in the other half of the mold. In either event the finished article is easily extracted. The shiftable sections 6 are then moved back to their operative position, the wedge 18 is again lowered, and the press is ready for another operation.

It will be observed that the mold and cores are set at an angle of forty-five degrees. This arrangement is intended for the purpose of more easily opening the mold to form a box with panels. In the case of making a battery box without any panels on the sides the mold could then be drawn away at right angles which would make it an easy matter to put the panels on the ends but not on the sides. However, the present arrangement makes it possible to panel all sides of the box. Furthermore, the mold is easier to build having two less corners to trim on the box or other article and having only two joints instead of four as boxes formed on presses heretofore used.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A molding press for hollow articles and the like including a bed, a mold mounted on said bed and comprising a fixed mold section and a shiftable mold section, manually operated means for moving said shiftable mold section, a reciprocating core cooperating with said mold, and a pressure operated wedge cooperating with said shiftable mold section to lock the same with the rigid mold section.

2. A molding press for hollow articles and the like including a bed, a mold comprising a fixed mold section and a laterally shiftable mold section slidably mounted in the bed, a manually operated shaft journaled in the bed and operatively connected with said shiftable mold section, and locking means for the shiftable section operating in a direction at right angles to the plane of operation of the shiftable mold section.

3. A molding press for hollow articles including a bed, a mold including a fixed mold section mounted on said bed, a shiftable mold section slidably guided in said bed, a shaft journaled at one side of the shiftable mold section, a hub carried by said shaft, a lug carried by the shiftable mold section, a link pivotally connecting the lug and the hub, and a fluid operated wedge adapted to engage with the shiftable mold section to force the same into locking engagement with the rigid mold section, and a fluid operated core for said mold.

4. A molding press for hollow articles including a bed having a mold thereon including a fixed mold section and a laterally shiftable mold section having an inclined face thereon, means for manually manipulating said shifting section through the greater part of its movement, fluid operated wedge for engaging said wedge face on the shiftable mold section, and a fluid operated core for said mold.

In testimony whereof I hereunto affix my signature.

LOUIS W. HOTTEL.